United States Patent
Cimecioglu et al.

(10) Patent No.: US 6,368,456 B1
(45) Date of Patent: Apr. 9, 2002

(54) METHOD OF MAKING PAPER FROM ALDEHYDE MODIFIED CELLULOSE PULP WITH SELECTED ADDITIVES

(75) Inventors: A. Levent Cimecioglu, Princeton; John S. Thomaides, Berkeley Heights; Kraig A. Luczak, Plainsboro, all of NJ (US); Robert D. Rossi, Levittown, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/454,400

(22) Filed: Dec. 3, 1999

Related U.S. Application Data

(63) Continuation-in-part of application No. 09/375,939, filed on Aug. 17, 1999, now Pat. No. 6,228,126.

(51) Int. Cl.$^7$ ................................................ D21F 11/00
(52) U.S. Cl. ..................... 162/146; 162/157.1; 162/158; 162/164.6; 162/164.7; 162/175; 162/183; 8/108; 8/116.1; 8/120; 536/56; 536/111
(58) Field of Search ............................... 162/146, 157.1, 162/158, 164.6, 164.7, 166, 168.2, 168.7, 175, 178, 182, 183; 8/108, 116.1, 120; 536/56, 111

(56) References Cited

U.S. PATENT DOCUMENTS

| | | | |
|---|---|---|---|
| 3,062,652 A | 11/1962 | Jeffreys et al. | ................ 96/99 |
| 3,086,969 A | 4/1963 | Slager | ........................ 260/209 |
| 3,297,604 A | 1/1967 | Germino | .................... 260/17.4 |
| 3,740,391 A | 6/1973 | Lyman et al. | ......... 260/233.3 R |
| 4,119,487 A | 10/1978 | Tessler | ....................... 162/175 |
| 4,663,448 A | 5/1987 | Chiu | .......................... 536/111 |
| 4,675,394 A | 6/1987 | Solarek et al. | ................ 536/43 |
| 4,780,339 A | 10/1988 | Lacourse et al. | ........ 427/389.7 |
| 5,334,756 A | 8/1994 | Likibi et al. | ................ 562/565 |
| 5,504,246 A | 4/1996 | Likibi et al. | ................ 562/540 |
| 5,698,688 A | 12/1997 | Smith et al. | .................. 536/56 |
| 6,087,135 A | 7/2000 | Kierulff | ..................... 435/101 |

FOREIGN PATENT DOCUMENTS

| | | | |
|---|---|---|---|
| DE | 197 46 805 C 1 | 10/1997 | ........... C08B/31/18 |
| WO | WO 95/07303 | 3/1995 | ........... C08B/37/00 |
| WO | WO 96/38484 | 12/1996 | ........... C08B/31/18 |
| WO | WO 97/36052 | 10/1997 | .......... D21H/21/20 |
| WO | WO 99/23117 | 5/1999 | ........... C08B/15/04 |
| WO | WO 99/23240 | 5/1999 | ........... C12P/19/04 |
| WO | WO 00/50388 | 8/2000 | ......... C07C/239/08 |
| WO | WO 00/50462 | 8/2000 | ........... C08B/15/02 |
| WO | WO 00/50463 | 8/2000 | ........... C08B/15/02 |
| WO | WO 00/50621 | 8/2000 | ............. C12P/1/00 |

OTHER PUBLICATIONS

J. Bobbitt et al., "Organic Nitrosonium Salts as Oxidants in Organic Chemistry", *Heterocycles*, vol. 27, No. 2, 1988, pp. 509–533.

A. de Nooy et al., "Selective Oxidation of Primary Alcohols Mediated by Nitroxyl Radical in Aqueous solution. Kinetics and Mechanism", *Tetrahedron*, vol. 51, No. 29, 1995, pp. 8023–8032.

P. Chang et al., "Oxidation of Primary Alcohol Groups of Naturally Occurring Polysaccharides with 2,2,6,6–Tetramethyl–1–Piperiding Oxoammonium Ion", *J. Carbohydrate Chemistry*, 15(7), 1996, pp. 819–830.

Takuya Kitaoka, Akira Isogai, Fumihiko Onabe, *Nordic Pulp and Paper Research Journal vol. 14 No. Apr. 1999* "Chemical Modification of Pulp Fibers by TEMPO–Mediated Oxidation".

*Primary Examiner*—Christopher A. Fiorilla
*Assistant Examiner*—Mark Halpern
(74) *Attorney, Agent, or Firm*—Laurelee A. Duncan; Eugene Zajarlla, Esq.

(57) ABSTRACT

This invention relates to paper comprising aldehyde modified cellulose pulp prepared using nitroxyl radical mediated oxidation and further containing selected additives comprising aldehyde functional polymers or polymers containing functionality capable of reacting with aldehyde groups and having improved strength properties. This invention further relates to paper made from aldehyde modified cellulose pulp where an hydroxyl group containing polymer is added to the paper to provide wet strength properties.

19 Claims, No Drawings

10

METHOD OF MAKING PAPER FROM ALDEHYDE MODIFIED CELLULOSE PULP WITH SELECTED ADDITIVES

This application is a continuation-in-part of application Ser. No. 09/375,939 filed Aug. 17, 1999, now U.S. Pat. No. 6,228,126.

BACKGROUND OF THE INVENTION

This invention relates to paper comprising aldehyde modified cellulose pulp or fiber prepared using defined oxidation conditions and which further contains selected additives to provide paper products with significantly improved wet and dry strength properties. More particularly, this invention involves paper made from celullose pulp modified by nitroxyl radical mediated oxidiation and containing additives comprising polymers containing functionality capable of reacting with aldehyde or aldehyde functional polymers. This invention also involves paper made from aldehyde modified cellulose pulp where an hydroxyl group containing material is added to the papermaking operation to provide unexpected additional wet strength, dry strength, and/or wet strength/dry strength ratio properties in resulting paper product.

The term "paper" as used herein, includes sheet-like masses and molded products made from pulp or fibrous cellulosic material which may be derived from natural sources. Paper may also be made from synthetic cellulosic fibers and regenerated cellulose as well as recycled waste paper. In addition, paper made from combinations of cellulosic and synthetic materials are applicable herein. Paperboard is included within the broad term "paper".

Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that water is removed, thereby forming a sheet of the consolidated fibers, which upon pressing and drying can be processed into dry roll or sheet form. Typically in papermaking, the feed or inlet to a papermaking machine is an aqueous slurry or water suspension of pulp fibers which is provided from what is called the "wet end" system. In the wet end, the pulp along with other additives are mixed in an aqueous slurry and subjected to mechanical and other operations such as beating and refining. Various additives are commonly added to help provide different properties in the paper product.

The use of aldehyde functional additives in the paper industry as wet and dry strength agents is well known. For example, both oxidative and non-oxidative methods are known for introducing aldehyde groups into starch. Use of these products in papermaking to provide wet and dry strength properties involves the addition of this separate starch additive component.

U.S. Pat. No. 5,698,688 issued to D. J. Smith et al. on Dec. 16, 1997 discloses aldehyde modified cellulose fibers formed from esterified 1,2-disubstituted alkenes and which are useful in providing paper products with wet strength properties.

In copending application Ser. No. 09/374,939 filed Aug. 17, 1999, the preparation of aldehyde modified cellulose pulp using selected oxidation conditions was described. In that application, the aldehyde modified cellulose pulp products were disclosed as being useful in preparing paper products having improved wet strength and dry strength properties.

While the known methods of preparing paper as described have provided products with good wet and dry strength properties, there is always the need for paper products having further significantly improved strength properties.

SUMMARY OF THE INVENTION

Now it has been found that paper comprising aldehyde modified cellulose pulp prepared using defined nitroxyl oxidation conditions and which further contains selected additives comprising polymers containing functionality capable of reacting with aldehyde or aldehyde functional polymers surprisingly have significantly improved wet and dry strength properties.

More particularly, this invention relates to aldheyde modified cellulose pulp with improved wet and dry strength properties wherein the pulp is prepared in an aqueous solution with an oxidant having an equivalent oxidizing power of up to 5.0 g of active chlorine per 100 g of cellulose and an effective mediating amount of nitroxyl radical, the reaction being carried out at a pH of about 8.0 to 10.5 and a temperature of from about 5 to 50° C. and further contains an effective amount of at least one additive polymer selected from the group consisting of an aldehyde functional polymer and a polymer containing functional groups capable of reacting with aldehyde groups.

In another embodiment, this invention relates to paper made from aldehyde modified cellulose pulp where an hydroxyl group containing material is added to the papermaking operation to provide significantly improved wet strength, dry strength, and/or wet strength/dry strength ratio properties in the resulting paper product.

DETAILED DESCRIPTION OF THE INVENTION

The paper product of this invention involves aldehyde modified cellulose pulp prepared using defined nitroxyl mediated oxidation conditions and which further contains selected additives to further improve wet strength, dry strength, and/or wet strength/dry strength ratio properties comprising polymers containing functionality capable of reacting with aldehyde or aldehyde functional polymers.

The additives used in this invention may be polymers containing functionality capable of reacting with aldehyde and will contain at least two aldehyde reactive functional groups, particularly more than two aldehyde reactive functionalities per polymer chain or molecule. More particularly, the polymer with aldehyde reactive functionality will be selected from the group consisting of hydroxyl, amino, amido, thiol, imido and carboxylic acid groups or the alkali, alkaline earth or ammonium salts thereof, or combinations thereof. Hydroxyl groups are most particularly suitable.

Additive polymers with hydroxyl groups include carbohydrates or polysaccharides such as starch, cellulose, gums and derivatives thereof. Illustrative additive polymers with hydroxyl groups include carbohydrate or polysaccharide polymers or modified carbohydrate polymers such as starch or starch derivatives; guar gum or guar gum derivatives such as Hydroxypropyl Guar Hydroxypropyltrimonium Chloride, hydroxyethyl cellulose, Polyquaternium-4, Polyquaternium-10, dextran or dextran derivatives, pullulan or pullulan derivatives, corn fiber gum or derivatives of corn fiber gum, arabinogalactan or derivatives of arabinogalactan and locust bean gum; poly(vinly alcohol) or copolymers of vinyl alcohol with other monomers, which are typically prepared by hydroysis of copolymers of vinyl acetate with other monomers; and copolymers of hydroxyl alkyl esters of acrylic or methacrylic acid such as 2-hydroxyethyl methacrylate with other copolymerizable monomers. Useful carbohydrate derivatives include cationic, anionic, amphoteric, ester and ether derivatives with cationic and amphoteric derivatives being particularly suitable. It is further noted that the hydroxyl group containing polymers may contain other substituent groups.

Polymers with amino groups are illustrated by poly(vinyl amine) or vinyl amine copolymers, which are typically made by hydrolysis of copolymers of vinyl formamide and other copolymerizable monomers, poly(ethylene imine) and derivatives of poly(ethylene imine), and chitosan.

Examples of polymers with amido groups include poly (acrylamide) or acrylamide copolymers with other copolymerizable monomers, poly(vinyl formamide) or vinyl formamide copolymers and poly(vinyl acetamide) or vinyl acetamide copolymers.

Illustrative imido containing polymers include poly (maleimide) and copolymers of maleimide with other copolymerizable monomers.

The polymers containing carboxylic acid functionality or the alkali, alkaline earth or ammonium salts thereof, include homopolymers or copolymers with other copolymerizable monomers of (meth)acrylic acid and the alkali, alkaline earth or ammonium salts thereof, crotonic acid, dicarboxylic acid containing monomers such as maleic, fumaric and itaconic acids and anhydrides, the half esters of unsaturated dicarboxylic acids such as methyl hydrogen fumarate, butyl hydrogen fumarate, ethyl hydrogen maleate, butyl hydrogen maleate and the respective alkali, alkaline earth or ammonium salts thereof.

The additives used in this invention may be aldehyde functional polymers and more particularly aldehyde functional polymers containing two or more aldehydes per polymer chain or molecule. Useful aldehyde functional polymers include polysaccharide aldehydes having the general structure:

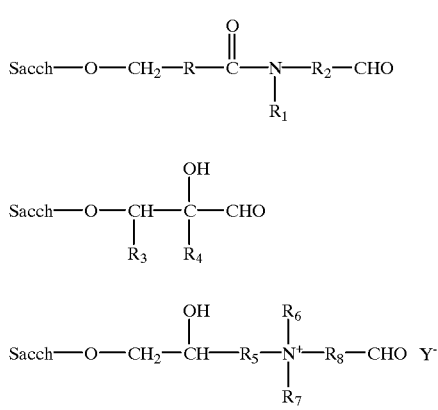

or
Sacch—O—$R_9$—CHO where Sacch represents a polysaccharide molecule such as starch, cellulose or a gum; R is $(CH_2)_n$ or a divalent aromatic group and n is zero or greater; $R_1$, $R_6$ and $R_7$ are hydrogen, an alkyl (particularly methyl), aryl, aralkyl or alkaryl group; $R_2$, $R_5$ and $R_8$ are $(CH_2)_m$ with m being 1 to 6, particularly 1 to 2; $R_3$ and $R_4$ are hydrogen or lower alkyl, particularly methyl; $R_9$ is a divalent organic group, containing no starch reactive substituents and Y is an anion such as a halide, sulfate or nitrate. The polysaccharide molecule may be modified by the introduction of cationic, anionic, nonionic, amphoteric and/or zwitterionic substituent groups.

The polysaccharide aldehyde derivatives, I to IV may be prepared by a non-oxidative method which involves reacting the polysaccharide base with a derivatizing acetal reagent in the presence of alkali. Further description of these aldehyde derivatives and the method of preparation are further disclosed in U.S. Pat. No. 4,675,394 issued to D. Solarek et al. on Jun. 23, 1987, which reference is incorporated herein by reference.

Other useful starch aldehyde derivatives include those prepared by the selective oxidation of starch using a limited amount of oxidant and a nitroxyl radical mediator. Such starch aldehyde derivatives may be prepared by oxidizing starch in an aqueous system with an oxidant having an equivalent oxidizing power of up to 14.18 g of active chlorine per mole of starch anhydroglucose unit and a mediating effective amount of nitroxyl radical, the reaction being carried out at a temperature of no more than about 15° C. and at a pH of from about 8.0 to 10.5. The resulting starch aldehyde derivatives may have up to 15 mole % of C-6 aldehyde groups per mole of starch anhydroglucose units and minimal carboxylic acid content.

Additional aldehyde derivatives which may be used as additives include the starch and guar gums derivatives that have been oxidized using an enzyme such as galactose oxidase as disclosed in U.S. Pat. No. 3,297,604 issued to F. Germino on Jan. 10, 1967 and U.S. Pat. No. 4,663,448 issued to C. Chiu on May 5, 1987. Dialdehyde starches prepared by methods such as the oxidation of starch with periodic acid are disclosed in U.S. Pat. No. 3,086,969 issued to J. E. Slager on Apr. 23, 1963 and dialdehyde gums using periodate or periodic acid are disclosed in U.S. Pat. No. 3,062,652 issued to R. Jeffreys et al. on Nov. 6, 1962. Other useful aldehyde functional polymers or compounds include those obtained by the addition of glyoxal to poly (acrylamide) polymers and copolymers as disclosed in U.S. Pat. No. 3,740,391 issued Jun. 19, 1973 to L. Williams et al., as well as glyoxal and glutaraldehyde.

The aldehyde functional polymer additives may be used either alone or in conjunction with any of the aforementioned polymer additives containing functionality capable of reacting with aldehyde groups.

The additive polymers used in this invention can be added to the oxidized pulp at any time in the papermaking process. If they are added in the wet end, additive polymers which bear a net cationic charge are particularly suitable. Cationic charge can be introduced into these polymers or other materials by a number of different means known in the art. For example, if the additive is either a polymer containing functionality capable of reacting with aldehyde or an aldehyde functional polymer that is made by free radical polymerization of copolymerizable monomers, a positive charge can be introduced into the copolymer by including in the copolymerization a cationic monomer such as (3-acrylamidopropyl)trimethyl ammonium chloride, [2-(acryloxy)ethyl]trimethylammonium methyl sulfate, 2-(dimethylamino)ethyl acrylate, [3-(methacryloylamino) propyl]trimethylammonium chloride, [2-(methacryloyloxy) ethyl]trimethylammonium methyl sulfate, 2-(dimethylamino)ethyl methacrylate, 2-aminoethyl methacrylate hydrochloride, diallyldimethylammonium chloride, vinyl imidazole and vinyl pyridine and substituted derivatives thereof. Alternatively, positive charge can be introduced by reaction of the additive polymers with reagents that bear a positive charge such as disclosed in "Cationic Starches" by D. Solarek in *Modified Starches: Properties*

*and Uses*, chapter 8, 1986 and in U.S. Pat. No. 4,119,487 issued Oct. 10, 1978 to M. Tessler. The additive may also be sprayed or applied onto the wet web either as a solution, dispersion or uncooked slurry.

The cellulose pulp aldehyde derivatives used in this invention are prepared by a method which involves nitroxyl mediated oxidation. More particularly, the cellulose pulp aldehyde derivatives are prepared by a method which involves the selective oxidation of cellulose and cellulose pulp or fibers using a limited amount of oxidant mediated with a nitroxyl radical under defined conditions to provide derivatives with effective aldehyde content making them particularly suitable for use in providing paper with desired wet strength, temporary wet strength and dry strength properties.

The nitroxyl radical mediator used herein is a di-tertiary alkyl nitroxyl radical having one of the following formulas:

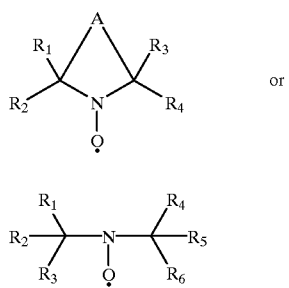

where A represents a chain of particularly two or three atoms, in particular carbon atoms or a combination of one or two carbon atoms with an oxygen or nitrogen atom, and the R groups represent the same or different alkyl groups. Chain A may be substituted by one or more groups such as alkyl, alkoxy, aryl, aryloxy, amino, amido or oxo groups, or by a divalent group or multivalent group which is bound to one or more other groups having formula I. Particularly useful nitroxyl radicals are di-tertiary alkyl nitroxyl radicals having the formula:

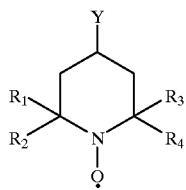

where Y is either H, OH or

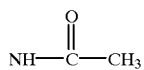

and each of the R groups represent the same or different alkyl groups of 1 to 18 carbon atom and more particularly methyl groups. Nitroxyl radicals of this type include those where a) the R groups are all methyl (or alkyl of 1 carbon atom) and Y is H, i.e., 2,2,6,6-tetramethyl-1-piperdinyloxy (TEMPO); b) R groups are methyl and X is OH and identified as 4-hydroxy-TEMPO; and c) R groups are methyl and X is

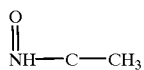

and identified as 4-acetamido-TEMPO. A particularly suitable nitroxyl radical is TEMPO or 4-acetamido-TEMPO. The nitroxyl radical is used in an effective amount to mediate the oxidation, more particularly from about 0.001 to 20% by weight, most particularly from about 0.01 to 0.1% by weight, based on the weight of cellulose, cellulose pulp or fiber. The nitroxyl radical can be added to the reaction mixture or generated in situ from the corresponding hydroxylamine oroxoammonium ion.

The oxidant used in this invention can be any material capable of converting nitroxyl radicals to their corresponding oxoammonium salt. Particularly useful oxidants are the alkali or alkaline earth metal hypohalite salts such as sodium hypochlorite, lithium hypochlorite, potassium hypochlorite or calcium hypochlorite. An alkali or alkaline earth metal hypobromite salt may also be used and it may be added in the form of the hypobromite salt itself, such as sodium hypobromite, or it may be formed in situ from the addition of a suitable oxidant such as sodium hypochlorite and an alkali or alkaline earth metal bromide salt such as sodium bromide. The bromide ion is generally in the form of sodium bromide. Additional oxidants that can be used in this method include hydrogen peroxide in combination with a transition metal catalyst such as methyltrioxorhenium (VII); hydrogen peroxide in combination with an enzyme; oxygen in combination with a transition metal catalyst; oxygen in combination with an enzyme; peroxyacids such as peracetic acid and 3-chloroperoxybenzoic acid; alkali or alkaline earth metal salts of persulfates such as potassium persulfate and sodium persulfate; alkali or alkaline earth metal salts of peroxymonosulfates such as potassium peroxymonosulfate; chloramines such as 1,3,5-trichloro-1,3,5-triazine-2,4,6(1H, 3H,5H)trione, 1,3-dichloro-1,3,5-triazine-2,4,6(1 H,3H,5H) trione sodium salt, 1,3-dichloro-5,5-dimethylhydantoin, 1-bromo-3-chloro-5,5-dimethylhydantoin, and 1-chloro-2, 5-pyrrolidinedione; and alkali or alkaline earth metal salts of ferricyanide. This list of oxidants is only illustrative and is not intended to be exhaustive. The oxidants can be used alone or in combination with an alkali or alkaline earth metal bromide salt. A particularly suitable oxidant is sodium hypochlorite or sodium hypobromite formed from the addition of sodium hypochlorite and sodium bromide.

The important factor in the use of the oxidant is that it must be used in a limited amount that has the equivalent oxidizing power of up to 5.0 g of active chlorine per 100 g of cellulose or cellulose pulp. More particularly, the amount of oxidant used will have an equivalent oxidizing power of from about 0.05 to 5.0 g of active chlorine, most particularly from about 0.5 to 2.5 g of active chlorine per 100 g of cellulose or cellulose pulp. When sodium hypochlorite is used, it is used in a limited amount of up to about 10 percent by weight based on the weight of cellulose or cellulose pulp, more particularly from about 0.1 to 10%, most particularly from about 1 to 5% by weight based on the weight of cellulose or cellulose pulp. Bromide in the form of sodium bromide will generally be used in an amount of from about 0.1 to 5% by weight and particularly from about 0.25 to 2% by weight based on the weight of cellulose or cellulose pulp. By limiting the amount of oxidant under defined aqueous conditions, the cellulose aldehyde derivatives are selectively prepared at effective high aldehyde levels. Such high aldehyde cellulose products are particularly useful in preparing paper with wet strength, temporary wet strength, dry strength and high wet strength/dry strength ratio properties.

The cellulose material used as the starting material may be any cellulose, cellulosic fiber or pulp material. This includes hardwood or softwood cellulosic fibers such as bleached and unbleached sulfate (Kraft), bleached and unbleached sulfite, bleached and unbleached soda, neutral sulfite, semi-chemical, groundwood, chemi-groundwood, and any combination of these fibers. In addition, synthetic cellulosic fibers of the viscose rayon or regenerated cellulose type can also be used, as well as recycled waste papers from various sources. The consistency in water of the cellulose or pulp that is used will be from about 0.1 to 15% by weight solids in water, particularly from about 1 to 5% by weight. When used in papermaking other additives such as desired inert fillers or retention aids may be added to the cellulose pulp. Such materials include clay, titanium dioxide, talc, calcium carbonate, calcium sulfate and diatomaceous earth. Rosin or synthetic internal size may also be present, if desired.

The oxidation reaction of the cellulosic material is carried out in an aqueous solution. The pH of the reaction is maintained at about 8.0 to 10.5, particularly about 9 to 10, the temperature is maintained at from about 5 to 50° C., particularly from about 20 to 30° C. The extent of the reaction is controlled by the amount of oxidant used or the reaction time. Generally the reaction time will be from about 5 to 60 minutes, and more particularly from about 20 to 30 minutes.

By using the reagent and component amounts as defined previously and the noted reaction conditions, controlled amounts of aldehyde functionality, particularly C-6 aldehyde, can be obtained that are suitable and effective in providing desired wet strength, temporary wet strength, and dry strength properties and wet strength/dry strength ratios desired in the final prepared paper product. The cellulose aldehyde derivatives prepared in accordance with this invention will have effective aldehyde functionality of from about 1 to 20 and particularly from about 5 to 20 mmole/100 g of cellulosic material i.e., cellulose or cellulose pulp. Carboxylic acid functionality will also be generated or formed during the oxidation process. Amounts of carboxyl content generated will generally be from about 1 to 40 mmole/100 g of cellulose or cellulose pulp, particularly from about 1 to 20 and more particularly from about 1 to 10 mmole/100 g cellulose or cellulose pulp. It should be noted that this amount of carboxylic acid functionality is in addition to what may already be present in the cellulose or cellulose pulp naturally or by virtue of the type of processed pulp used, such as bleached sulfate, bleached sulfite, etc. The effective level of aldehyde is an important aspect of this invention and one way this can be defined is by the ratio of aldehyde to generated carboxylic acid functionalities. Such levels can be defined by aldehyde to generated carboxylic acid ratios of greater than or equal to 0.5 (based on mmole/ 100 g of cellulose or cellulose pulp of each functionality) and particularly greater than or equal to 1.0. While recognizing that the amount of additional carboxylic functionality (i.e., other than generated) will vary and may be fairly low, there nevertheless will be some present and this will affect the level of total carboxylic acid functionality. Considering this and based on total carboxylic acid, the ratio of aldehyde to carboxylic acid functionality will be from about 0.2 or more. The significance of this aldehyde content is particularly manifested in the resulting properties found in paper prepared from the oxidized cellulose material. High wet strength, temporary wet strength and dry strength properties are found. Products having high wet strength/dry strength ratios of greater than 20% have been obtained in paper using these selectively modified cellulose aldehyde derivatives indicating improved properties such as softness.

In another embodiment of this invention, the hydroxyl group containing polymers as described previously, may be used with any aldehyde modified cellulose pulp to provide further improved wet strength and dry strength properties. This is especially unexpected since the hydroxyl group containing polymer additives have not been known to provide wet strength properties to paper. Furthermore, the wet strength/dry strength ratio is significantly improved by the use of such hydroxyl group containing polymer additives with oxidized cellulose pulp. This improved ratio is due to the greater percent increase of wet strength than the corresponding percent increase of dry strength. Products having high wet strength/dry strength ratios of greater than 25% have been obtained. The aldehyde modified cellulose pulp as used in this embodiment may be pulp provided by any method including, but not limited to, the nitroxyl radical mediated oxidation as described herein and the aldehyde modified cellulose fiber formed from esterified 1,2-disubstituted alkenes as disclosed in U.S. Pat. No. 5,698,688 issued to D. J. Smith et al. on Dec. 16, 1997.

It is noted that use of the modified aldehyde cellulose derivatives as described herein in papermaking may involve the use of such derivatives as the whole or entire pulp or paper stock or it may be used as a component of the paper stock (i.e., in amounts of 20, 40, 60% by weight etc.).

The proportion of additive polymers to be incorporated into the paper pulp may vary in accordance with the particular aldehyde modified cellulose pulp involved and the properties desires. In general, it is desired to use about 0.05 to 15% and particularly about 0.1 to 5% of the additive by weight based on the dry weight of the pulp. Within this range, the precise amount which is used will depend upon the type of pulp being used, the specific operating conditions and the particular end use for which the paper is intended.

Any desired inert mineral fillers may be added to the pulp which contains the additive polymers of this invention. Such materials include clay, titanium dioxide, talc, calcium carbonate, calcium sulfate and diatomaceous earths. Other additives commonly introduced into paper may also be added to the pulp, for example dyes, pigments, sizing additives such as rosin or synthetic internal size, alum, anionic and cationic retention aids, microparticle systems, etc.

The following examples will more fully illustrate the embodiments of this invention. In the examples, all parts and percentages are by weight and all temperatures in degrees Celsius unless otherwise noted. Also, when referring to the pulp by weight, it is the weight of the pulp per se, i.e., it includes equilibrium moisture content.

EXAMPLE 1

Modification of Northern Softwood Kraft (NSK) Pulp

To a 1600 g stirred suspension of NSK pulp at 3% consistency (48 g pulp) was added 4.8 mg 4-acetamido-TEMPO and 0.24 g sodium bromide [0.01% and 0.5%] on weight of pulp (owp) respectively]. The pH of the mixture was adjusted to 9.5 with 0.49 N sodium hydroxide. Sodium hypochlorite (7.93 g; 12.1% solution; 2% owp), whose pH was also adjusted to 9.5 using concentrated HCl, was then added all at once and the mixture was stirred at 25° C. for 30 minutes. The pH of the suspension was maintained throughout using a Brinkmann pH STAT 718 Titrino at 9.5 with 0.49 N NaOH (6.8 mL). At the end of the treatment period, the reaction was terminated by adding ascorbic acid to the mixture until its pH was lowered to 4.0 to 4.5 range (ca. 1 g).

The pulp was filtered and washed extensively with water whose pH was adjusted to 4.5 to 5.5. It was then either re-slurried in water for subsequent use in handsheet making or dried in air at room temperature for future use.

Determination of Aldehyde Content of the Modified Pulp

Aldehyde content of modified NSK pulp was determined using hydroxylamine hydrochloride titration via oxime derivatization to the following reaction and the procedure.

$$RCHO + NH_2OH \cdot HCl \rightarrow RCHNOH + HCl$$

The oxidized pulp suspension in water 1200 g at 2% consistency was pH adjusted to 4 with aqueous HCl. To this mixture was added dropwise a large excess of an aqueous solution of 2 M hydroxylamine hydrochloride solution (ca. 15 mL), whose pH was also adjusted to 4 with HCl. During the reaction, the pH of the mixture was maintained at 4 via titration with a 0.49 N NaOH solution using a Brinkmann pH STAT 718 Titrino. The titration was continued until no further reduction in pH of the mixture could be detected (ca. 1 h). Aldehyde content was then calculated to be 8.4 mmole/100 g pulp from the total consumption of NaOH (4.1 mL) using the following equation:

$$\text{mmole}/100\text{ g} - CHO = \frac{\text{mL of NaOH titrant} \times \text{N of NaOH}}{\text{pulp weight in g}} \times 100$$

Carboxylic Acid Content of Modified Pulp

The level of carboxylic acid formed during the NSK pulp modification was calculated from the amount of NaOH titrant consumed to maintain the pH of the reaction (6.8 mL of 0.49N solution). This provided a direct measure of the additional carboxylic acid generated on the pulp which was 6.9 mmole/100 pulp, calculated using the following equation:

$$\text{mmole}/100\text{ g} - COOH = \frac{\text{mL of NaOH titrant} \times \text{N of NaOH}}{\text{pulp weight in g}} \times 100$$

EXAMPLE 2

Modification of Hardwood Pulp

To a 1600 g stirred suspension of hardwood pulp at 3% consistency (48 g pulp) was added 4.8 mg 4-acetamide-TEMPO and 0.24 g sodium bromide. The pH of the mixture was adjusted to 9.5 with 0.49 N sodium hydroxide. Sodium hypochlorite (7.93 g; 12.1% solution; 2% owp), whose pH was also adjusted to 9.5 using concentrated HCl, was then added all at once and the mixture was stirred at 25° C. for 30 minutes. The pH of the suspension was maintained throughout using a Brinkmann pH STAT 718 Titrino at 9.5 with 0.49N NaOH, consuming 4.2 mL. At the end of the treatment period, the reaction was terminated by adding ascorbic acid to the mixture until its pH was lowered to 4.0 to 4.5 range (ca. 1 g). The pulp was filtered and washed extensively with water whose pH was adjusted to 4.5 to 5.5. It was then either re-slurried in water for subsequent use in handsheet-making or air-dried at room temperature for future use.

The aldehyde and the carboxylic acid contents of the modified hardwood pulp were determined as described in Example 1 and was 7.7 mmole and 4.3 mmole respectively per 100 g pulp.

EXAMPLE 3

The modified pulp samples described in Examples 1 and 2 (600 to 650 CSF) were formed into 18 lb/3300 ft$^3$ handsheets from 0.3% consistency and at pH 5 to 6 on an M/K Sheet Former according to TAPPI Standard Test Method T 205. The wet end additives (as 0.5 to 1.0% cooks or water solutions) were introduced to the pulp suspension in a Waring blender and mixed for 30 seconds before the sheet formation. Addition levels varied between 2.5 to 20 pounds per ton (lb/t) of pulp which are given in the individual examples. Conditioned handsheets (25° C. and 50% RH) were cut into strips (1" wide) which were then tested for initial wet strength and dry tensile strength at the breaking point according to the TAPPI Standard Test Methods T 456 and 494.

Table 1 illustrates the effect of several cationic starch type polyhydroxyl additives (CAT® 232 and REDIBOND™ 5330A starches from National Starch and Chemical Company) on paper strength properties when used in combination with the aldehyde modified softwood pulp described in Example 1.

TABLE 1

The effect of cationic starch type polyhydroxyl additives on paper strength properties based on aldehyde modified NSK softwood pulp.

| | | | Paper Properties | | |
| --- | --- | --- | --- | --- | --- |
| | Additive | | Wet | Dry | Wet/ |
| Pulp NSK Softwood | Cationic Starch | Addition level (lb/t) | Tensile Strength (g/in) | Tensile Strength (g/in) | Dry Ratio (%) |
| Unmodified | None | 0 | 52 | 2158 | 2 |
| Unmodified | CATO 232* | 10 | 55 | 2392 | 2 |
| Modified | None | 0 | 632 | 2675 | 24 |
| Modified | CATO 232* | 5 | 815 | 2758 | 30 |
| Modified | CATO 232* | 10 | 866 | 3097 | 28 |
| Modified | CATO 232* | 20 | 899 | 3114 | 29 |
| Modified | 67WF QUAT Waxy* | 5 | 789 | 2787 | 28 |
| Modified | 67WF QUAT Waxy* | 10 | 881 | 2895 | 30 |
| Modified | 67WF QUAT Waxy* | 20 | 925 | 3084 | 30 |
| Modified | REDIBOND 5330A* | 5 | 860 | 2943 | 29 |
| Modified | REDIBOND 5330A* | 10 | 895 | 2824 | 32 |
| Modified | REDIBOND 5330A* | 20 | 899 | 2989 | 30 |

*3-chloro-2-hydroxypropyltrimethylammonium chloride (QUAT) modified waxy maize starches; cationic nitrogen = 0.30%

The results show significant further improvements that are obtained in both wet and dry strengths as well as the wet/dry ratio of the handsheets when cationic starch type polyhydroxyl compounds are used in combination with the aldehyde and carboxylate modified softwood pulp.

EXAMPLE 4

This example illustrates the use of cationic starch type polyhydroxyl compounds (CATO 232 from National Starch and Chemical Company) as a wet and dry strength additive in combination with the aldehyde modified hardwood pulp prepared in Example 2 following the general procedure described in Example 3 (Table 2).

TABLE 2

The effect of a cationic starch type polyhydroxyl additive on paper strength properties based on aldehyde modified hardwood pulp.

| | Additive | | Paper Properties | | |
|---|---|---|---|---|---|
| Pulp Hardwood | Cationic Starch | Addition level (lb/t) | Wet Tensile Strength (g/in) | Dry Tensile Strength (g/in) | Wet/ Dry Ratio (%) |
| Unmodified | None | 0 | 28 | 1343 | 2 |
| Unmodified | CATO 232* | 10 | 46 | 1429 | 3 |
| Modified | None | 0 | 292 | 1445 | 20 |
| Modified | CATO 232* | 5 | 356 | 1563 | 23 |
| Modified | CATO 232* | 10 | 378 | 1576 | 24 |
| Modified | CATO 232* | 20 | 368 | 1677 | 22 |

*CATO 232: 3-chloro-2-hydroxypropyltrimethylammonium chloride modified waxy maize; cationic nitrogen = 0.30%

The results show significant further improvements that are obtained in both wet and dry strengths as well as the wet/dry ratio of the handsheets when a cationic starch type polyhydroxyl compound is used in combination with the aldehyde and carboxylate modified hardwood pulp.

EXAMPLE 5

This example illustrates the use of a cationic starch aldehyde (CO-BOND™ 1000Plus starch from National Starch and Chemical Company) as a wet and dry strength additive in combination with the aldehyde modified softwood and hardwood pulps prepared in Examples 1 and 2 following the general procedure described in Example 3 (Table 3).

TABLE 3

The effect of an aldehyde functional starch additive on paper strength properties based on aldehyde modified pulps.

| | Additive | | Paper Properties | | |
|---|---|---|---|---|---|
| Pulp | Alehyde Starch | Addition level (lb/t) | Wet Tensile Strength (g/in) | Dry Tensile Strength (g/in) | Wet/ Dry Ratio (%) |
| NSK Softwood | | | | | |
| Unmodified | None | 0 | 28 | 2171 | 1 |
| Unmodified | CO-BOND 1000Plus* | 10 | 346 | 2571 | 13 |
| Modified | None | 0 | 669 | 2558 | 26 |
| Modified | CO-BOND 1000Plus* | 2.5 | 738 | 2600 | 28 |
| Modified | CO-BOND 1000Plus* | 5 | 828 | 2926 | 28 |
| Modified | CO-BOND 1000Plus* | 10 | 1009 | 3246 | 31 |
| Hardwood | | | | | |
| UnModified | None | 5 | 28 | 1343 | 2 |
| UnModified | CO-BOND 1000Plus* | 10 | 240 | 1518 | 16 |
| Modified | None | 0 | 283 | 1343 | 21 |
| Modified | CO-BOND | 2.5 | 351 | 1462 | 24 |

TABLE 3-continued

The effect of an aldehyde functional starch additive on paper strength properties based on aldehyde modified pulps.

| | Additive | | Paper Properties | | |
|---|---|---|---|---|---|
| Pulp | Alehyde Starch | Addition level (lb/t) | Wet Tensile Strength (g/in) | Dry Tensile Strength (g/in) | Wet/ Dry Ratio (%) |
| Modified | 1000Plus* CO-BOND 1000Plus* | 5 | 401 | 1597 | 25 |
| Modified | CO-BOND 1000Plus* | 10 | 463 | 1698 | 27 |

*3-chloro-2-hydroxypropyltrimethyl ammonium chloride and 2-chloro-N-(2,2-dimethoxyethyl)-N-methylacetamide modified waxy maize starch; cationic nitrogen = 0.3% and acetal nitrogen = 0.4%, respectively.

The results show significant further improvements that are obtained in both wet and dry strengths as well as the wet/dry ratio of the handsheets when a cationic starch aldehyde is used in combination with the aldehyde and carboxylate modified softwood and hardwood pulps.

EXAMPLE 6

This example demonstrates the use of other cationic polysaccharide type hydroxyl group containing polymers [Chitosan from Sigma Corporation, cationic cellulose, (CELQUAT® H-100 derivatized cellulosic resin, Polyquaternium-4) and cationic guar (3-chloro-2-hydroxypropyltrimethyl-ammonium chloride modified guar gum; cationic nitrogen=0.30% from National Starch and Chemical Company)] as wet and dry strength additives in combination with the aldehyde modified NSK softwood pulp prepared in Example 1 following the general procedure described in Example 3 (Table 4).

TABLE 4

The effect of a cationic polysaccharide type hydroxyl group containing polymers as additives on paper strength properties based on aldehyde modified softwood pulp.

| | Additive | | Paper Properties | | |
|---|---|---|---|---|---|
| Pulp NSK Softwood | Polysaccharide | Addition level (lb/t) | Wet Tensile Strength (g/in) | Dry Tensile Strength (g/in) | Wet/ Dry Ratio (%) |
| Unmodified | None | 0 | 29 | 2300 | 1 |
| Unmodified | Chitosan | 10 | 72 | 2447 | 3 |
| Unmodified | Cationic Guar | 10 | 49 | 2527 | 2 |
| Unmodified | CELQUAT H-100 resin | 10 | 57 | 2101 | 3 |
| Modified | None | 0 | 608 | 2373 | 26 |
| Modified | Chitosan | 5 | 630 | 2479 | 25 |
| Modified | Chitosan | 10 | 646 | 2472 | 26 |
| Modified | Cationic Guar | 5 | 737 | 2538 | 29 |
| Modified | Cationic Guar | 10 | 662 | 2691 | 25 |
| Modified | CELQUAT H-100 resin | 5 | 835 | 2537 | 33 |
| Modified | CELQUAT H-100 resin | 10 | 841 | 2353 | 36 |

The results show significant further improvements that are obtained in both wet and dry strengths as well as the wet/dry ratio of the handsheets when various polysaccharides are used in combination with the aldehyde and carboxylate modified pulps.

EXAMPLE 7

Poly(MAPTAC-co-DMA-co-HEMA) Hydroxyl Group Containing Terpolymer Synthesis

This example describes the synthesis of several {poly([3-(methacryloylamino)propyl]trimethylammonium chloride (MAPTAC)-co-N, N-dimethylacrylamide (DMA)-co-2-hydroxyethyl methacrylate (HEMA)}terpolymers for use as a temporary wet strength additive with the aldehyde modified pulps. The following procedure was used for the synthesis of terpolymer B (Table 5). Polymers A and C–K (Table 5) with different amounts of the monomers were prepared using a similar procedure.

A four neck round bottom flask was equipped with an overhead mechanical stirrer, two pressure equalized addition funnels, one attached to an off-set adapter connected to a "Y" adapter and the second connected right to the "Y" adapter, thermometer, and a nitrogen inlet-topped reflux condenser. Correcting for the purity of each component (50% MAPTAC, 99% DMA, 97% HEMA, 97% ammonium persulfate) the monomers were weighed (anhydrous 0.63 g MAPTAC, 9.42 g DMA, 2.53 g HEMA) in a beaker). The mixture of monomers was then diluted with polished water to a total weight of 125 g. This solution was transferred to an addition funnel. The second addition funnel was then charged with an ammonium persulfate solution, which was made by dissolving ammonium persulfate (0.06 g, 0.5 weight percent) with 125 grams of polished water in a beaker. Both funnels were enclosed on top by a rubber septum, and purged with nitrogen for 20 minutes. Then an initial charge consisting of 25 mL of the monomer solution, and 25 mL of the initiator solution were introduced to the reaction flask. After stirring the initial charge at a temperature of 65 to 70° C. for 30 minutes, both monomer and initiator solutions were added simultaneously drop-wise over a 1.5 hour period while maintaining a temperature of 65 to 70° C. with an oil bath. At the conclusion of the slow additions, the polymerization solution was held at a temperature of 65 to 70° C. for an additional 4 to 5 hours. The flask was then cooled to room temperature, and the polymer lacquer was collected. A small portion of the lacquer was freeze-dried for characterization. Polymers were characterized for conversion, concentration, and molecular weight. The conversion of monomers to polymer was followed by dissolving the freeze-dried polymer in deuterium oxide ($D_2O$) and performing $^1H$ or $^{13}C$ NMR spectroscopy. The concentration of the polymer lacquer (generally 5.0 to 5.5%) was determined by measuring the weight difference before and after heating a small sample at 105° C. in an oven for 1 hour. The inherent viscosity (IV) (2.2 dl/g) was measured using 0.1 g/100 ml polymer in 0.1 N potassium chloride at a temperature of 25° C.

Table 5 lists the series of terpolymers of varying MAPTAC, DMA and HEMA composition that were synthesized and their effectiveness as wet and dry strength additives in combination with the aldehyde modified softwood pulp.

TABLE 5

Hydroxyl functional synthetic copolymers as paper strength additives with aldehyde modified softwood pulp.

| | Terpolymer Composition | | | | Paper Properties | | |
|---|---|---|---|---|---|---|---|
| Sample* | MAPTAC (g) | DMA (g) | HEMA (g) | IV (dL/g) | Wet Tensile Strength (g/in) | Dry Tensile Strength (g/in) | Wet/Dry Ratio (%) |
| | Modified softwood pulp | | | | 596 | 2462 | 24 |
| A | 0.64 | 11.89 | 0 | 2.8 | 557 | 2383 | 23 |
| B | 0.63 | 9.42 | 2.53 | 2.2 | 539 | 2102 | 26 |
| C | 0.63 | 6.89 | 5.01 | 1.4 | 604 | 2112 | 29 |
| D | 1.25 | 11.28 | 0 | 2.6 | 594 | 2380 | 25 |
| E | 1.26 | 8.77 | 2.57 | 2.6 | 562 | 2208 | 25 |
| F | 1.26 | 6.25 | 5.01 | 1.0 | 610 | 2193 | 28 |
| G | 2.50 | 10.03 | 0 | 3.5 | 357 | 2212 | 16 |
| H | 2.52 | 7.51 | 2.51 | 2.1 | 538 | 2161 | 25 |
| I | 2.51 | 4.96 | 5.01 | 0.9 | 546 | 2294 | 24 |
| J | 5.05 | 7.50 | 0 | 2.6 | 293 | 2119 | 14 |
| K | 5.0 | 5.0 | 2.51 | 2.3 | 494 | 2341 | 21 |

*Used at 10 lb/t.

EXAMPLE 8

This example demonstrates the use of various synthetic polymers with different aldehyde reactive functional groups as wet and dry strength additives in combination with the aldehyde modified NSK softwood pulp prepared in Example 1 following the general procedure described in Example 3 (Table 6) [Cat-PVOH=cationic poly(vinyl alcohol) (from Kuraray Co. Ltd., Polymer CM-318), PAM=poly(acrylamide-co-diallydimethylammonium chloride) (from Aldrich), Polymin PR971L=poly(ethyleneimine) (from BASF)].

TABLE 6

The effect of various aldehyde reactive functional group containing synthetic polymers as additives on paper strength properties based on aldehyde modified softwood pulp.

| | | Paper Properties | | |
|---|---|---|---|---|
| Additive | Addition Level (lb/t) | Wet Tensile Strength (g/in) | Dry Tensile Strength (g/in) | Wet/Dry Ratio (%) |
| None | 0 | 602 | 2421 | 25 |
| Cat-PVOH | 5 | 685 | 2231 | 31 |

TABLE 6-continued

The effect of various aldehyde reactive functional
group containing synthetic polymers as additives on paper
strength properties based on aldehyde modified softwood pulp.

| | | Paper Properties | | |
|---|---|---|---|---|
| Additive | Addition Level (lb/t) | Wet Tensile Strength (g/in) | Dry Tensile Strength (g/in) | Wet/Dry Ratio (%) |
| Cat-PVOH | 10 | 725 | 2313 | 31 |
| PAM | 10 | 683 | 2767 | 25 |
| Polymin PR971L | 10 | 675 | 2424 | 28 |

EXAMPLE 9

This example describes the spray application of some of the hydroxyl functional additives to an already formed handsheet made from aldehyde modified softwood. Therefore, following the preparation and handsheets as described in Example 3 several hydroxyl functional synthetic and natural polymers were applied to handsheets by evenly spraying on both sides from 0.5 to 1% solutions using a hand-held atomizer. The polymer add-ons were calculated based on the weight gain of moist sheets which were allowed to dry at room temperature in air. They were then conditioned and tested as described in Example 3. The results are given in Table 7. [PVOH=Poly(vinyl alcohol) (98% hydrolyzed, MV 124,000 to 186,000 from Aldrich), Frodex 20=DE 20 maltodextrin (from American Maize Corp.), Pullulan (from Polysciences Corp.)].

TABLE 7

Spray application of hydroxyl functional polymer to
handsheets made from aldehyde modified softwood and
their effect on the strength properties.

| | | Paper Properties | | |
|---|---|---|---|---|
| Additive | Addition Level (lb/t) | Wet Tensile Strength (g/in) | Dry Tensile Strength (g/in) | Wet/Dry Ratio (%) |
| None | 0 | 594 | 2429 | 24 |
| Frodex 20 | 10 | 587 | 2571 | 23 |
| Frodex 20 | 20 | 571 | 2694 | 21 |
| PVOH | 6 | 654 | 2656 | 25 |
| PVOH | 12 | 726 | 3124 | 23 |
| PVOH | 20 | 752 | 3363 | 22 |
| Pullulan | 12 | 710 | 3151 | 23 |
| Pullulan | 20 | 725 | 2935 | 25 |

What is claimed is:

1. In the method of making paper having wet strength, temporary wet strength, dry strength and high wet strength/dry strength ratio properties, the improvement comprising using an aldehyde modified cellulose pulp as the pulp stock which is prepared by oxidizing C-6 alcohol groups of cellulose or cellulose pulp in an aqueous system with an oxidant having an equivalent oxidizing power of up to about 5.0 g of active chlorine per 100 g of cellulose and a mediating effective amount of nitroxyl radical, and adding an effective amount of at least one additive polymer selected from the group consisting of an aldehyde functional polymer and a polymer containing functional groups capable of reacting with aldehyde groups.

2. The method of claim 1 wherein from about 0.05 to 15% by weight of polymer additive based on the dry weight of pulp is used.

3. The method of claim 2 wherein the additive polymer is the polymer containing functional groups capable of reacting with aldehyde groups having at least two aldehyde reactive functional groups selected from the group consisting of hydroxyl, amino, amido, thiol, imido and carboxylic acid, or the alkali, alkaline earth or ammonium salts thereof.

4. The method of claim 3 wherein at least one of the aldehyde reactive functional groups is a hydroxyl group.

5. The method of claim 1 wherein the aldehyde modified cellulose pulp is prepared by oxidizing at a pH of about 8.0 to 10.5 and a temperature of from about 5 to 50° C.

6. The method of claim 5 wherein the aldehyde modified cellulose pulp has from about 1 to 20 mmoles of aldehyde per 100 g of cellulose.

7. The method of claim 1 wherein the nitroxyl radical has the formula:

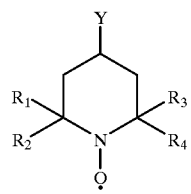

wherein Y is H, OH or NH—C(O)—CH$_3$; and R$_1$, R$_2$, R$_3$ and R$_4$ represent the same or different alkyl groups of 1 to 18 carbon atoms.

8. The method of claim 5 wherein the additive polymer is the polymer containing functional groups capable of reacting with aldehyde groups having at least two aldehyde reactive functional groups selected from the group consisting of hydroxyl, amino, amido, thiol, imido and carboxylic acid, or the alkali, alkaline earth or ammonium salts thereof.

9. The method of claim 8 wherein at least one of the aldehyde reactive functional groups in the additive polymer is a hydroxyl group.

10. The method of claim 9 wherein from about 0.05 to 15% by weight of the polymer additive is used based on the dry weight of pulp.

11. The paper made by the method of claim 1.

12. The paper made by the method of claim 5.

13. The paper made by the method of claim 10.

14. In the method of making paper having wet strength, temporary wet strength, dry strength properties and high wet strength/dry strength, the improvement comprising using a C-6 aldehyde modified cellulose pulp as the pulp stock and adding an effective amount of at least one additive polymer wherein the at least one additive polymer is a polymer containing functional groups capable of reacting with aldehyde groups having at least two aldehyde reactive functional groups and at least one of the aldehyde reactive functional groups is hydroxyl.

15. The method of claim 14 wherein the additive polymer is a carbohydrate selected from the group consisting of starch, cellulose and gum.

16. The method of claim 15 wherein from about 0.05 to 15% by weight of additive polymer based on the dry weight of pulp is used.

17. The method of claim 16 wherein the carbohydrate is a derivative selected from the group consisting of cationic, anionic, amphoteric, ester and ether derivatives.

18. The paper made by the method of claim 14.

19. The paper made by the method of claim 16.

* * * * *